(12) United States Patent
Murayama

(10) Patent No.: US 8,226,072 B2
(45) Date of Patent: Jul. 24, 2012

(54) POWER ASSIST APPARATUS WITH A CONTROLLED BRAKE MECHANISM FOR POSITIONING A WORKPIECE AND CONTROL METHOD THEREOF

(75) Inventor: Hideyuki Murayama, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 211 days.

(21) Appl. No.: 12/675,662

(22) PCT Filed: Apr. 22, 2009

(86) PCT No.: PCT/IB2009/005472
§ 371 (c)(1),
(2), (4) Date: Feb. 26, 2010

(87) PCT Pub. No.: WO2009/130596
PCT Pub. Date: Oct. 29, 2009

(65) Prior Publication Data
US 2010/0301539 A1 Dec. 2, 2010

(30) Foreign Application Priority Data
Apr. 24, 2008 (JP) ................................. 2008-114245

(51) Int. Cl.
*B66F 19/00* (2006.01)
(52) U.S. Cl. ........... 269/55; 269/56; 29/281.1; 700/213; 700/245; 700/250; 700/258; 700/264; 901/9; 414/1; 414/680; 414/738; 414/590
(58) Field of Classification Search .................. 248/324, 248/550; 269/55, 56, 71, 74, 75, 95; 29/281.1; 414/579, 589, 590, 580, 1, 2, 5, 699, 737–740; 700/114, 60, 213, 218, 245, 250, 260, 264, 700/255, 258; 901/15, 34, 46, 2, 6, 7, 49, 50

See application file for complete search history.

(56) References Cited

U.S. PATENT DOCUMENTS

| | | | | |
|---|---|---|---|---|
| 2,933,205 A | * | 4/1960 | MacDonald et al. | 414/735 |
| 3,272,347 A | * | 9/1966 | Lemelson | 414/728 |
| 4,367,998 A | * | 1/1983 | Causer | 414/4 |
| 4,884,938 A | * | 12/1989 | Fujita et al. | 414/541 |
| 5,155,423 A | * | 10/1992 | Karlen et al. | 318/568.11 |
| 5,247,728 A | * | 9/1993 | Egner-Walter et al. | 29/281.1 |
| 5,489,032 A | * | 2/1996 | Mayhall et al. | 212/285 |
| 5,783,922 A | | 7/1998 | Hashimoto et al. | |
| 6,061,890 A | * | 5/2000 | Shashlo et al. | 29/434 |
| 6,204,619 B1 | * | 3/2001 | Gu et al. | 318/568.11 |
| 6,204,620 B1 | * | 3/2001 | McGee et al. | 318/568.11 |
| 6,386,513 B1 | * | 5/2002 | Kazerooni | 254/270 |
| 6,394,731 B1 | * | 5/2002 | Konosu et al. | 414/5 |
| 6,430,473 B1 | * | 8/2002 | Lee et al. | 700/245 |
| 6,738,691 B1 | * | 5/2004 | Colgate et al. | 700/245 |

(Continued)

FOREIGN PATENT DOCUMENTS
DE 103 94 302 T5 5/2007
(Continued)

*Primary Examiner* — Joseph J Hail
*Assistant Examiner* — Tyrone V Hall, Jr.
(74) *Attorney, Agent, or Firm* — Kenyon & Kenyon LLP (57) ABSTRACT

If the rotation angle in a rotation direction allowed by a joint portion detected by the angle sensor is no more than a predetermined lower limit or no less than a predetermined upper limit, the controller maintains the released state of the brake mechanism so that the rotation of the workpiece in the direction is not restricted.

9 Claims, 10 Drawing Sheets

U.S. PATENT DOCUMENTS

| | | | |
|---|---|---|---|
| 2002/0082612 A1* | 6/2002 | Moll et al. | 606/130 |
| 2003/0135303 A1* | 7/2003 | Arai et al. | 700/245 |
| 2004/0003488 A1* | 1/2004 | Thompson | 29/281.1 |
| 2006/0178775 A1* | 8/2006 | Zhang et al. | 700/245 |
| 2007/0112458 A1* | 5/2007 | Kondo et al. | 700/213 |
| 2009/0194922 A1* | 8/2009 | Lin et al. | 269/55 |
| 2010/0183414 A1* | 7/2010 | Konosu et al. | 414/589 |

FOREIGN PATENT DOCUMENTS

| | | |
|---|---|---|
| JP | 10-279299 A | 10/1998 |
| JP | 10279299 A * | 10/1998 |
| JP | 11-245124 A | 9/1999 |
| JP | 2005-028492 A | 2/2005 |
| JP | 2005-154047 A | 6/2005 |

\* cited by examiner

POWER ASSIST APPARATUS WITH A CONTROLLED BRAKE MECHANISM FOR POSITIONING A WORKPIECE AND CONTROL METHOD THEREOF

This is a 371 national phase application of PCT/IB2009/005472 filed 22 Apr. 2009, claiming priority to Japanese Patent Application No. 2008-114245 filed 24 Apr. 2008, the contents of which are incorporated herein by reference.

BACKGROUND OF THE INVENTION

1. Field of the Invention

The invention relates to a power assist apparatus and a control method for a power assist apparatus.

2. Description of the Related Art

In manufacturing sites and the like for manufacturing industrial products, a power assist apparatus is used as an apparatus for assisting an operator in the conveyance of heavy loads (workpieces). A workpiece attachment operation includes conveyance and positioning of the workpiece, but when the workpiece is conveyed cooperatively by the operator and the power assist apparatus, the power required to convey the workpiece can be provided by the power assist apparatus. Moreover, by teaching the power assist apparatus, positioning of the workpiece can be performed efficiently. Hence, through use of a power assist apparatus, the workload of the operator can be reduced and an improvement in operability can be achieved.

A power assist apparatus having a workpiece holding device for holding a workpiece serving as a conveyance subject is available. The workpiece holding device is provided with a handle, which serves as a gripping portion, and an operator grips the handle to operate the workpiece holding device in a desired direction. Moreover, a dead man switch is provided on the handle around the position naturally gripped by the operator. While the operator grips the handle, the dead man switch is pressed. On the contrary, when the operator removes his/her hand from the gripping portion (handle), the dead man switch is released.

Then, it is determined whether the operator is operating the workpiece holding device according to the pressed state of the dead man switch. If it is determined that the operator is not operating the workpiece holding device (i.e., the operator has removed his hand from the handle), each joint portion provided on an arm that supports the power assist apparatus is locked to maintain the attitude (inclination and conveyance direction) of the workpiece holding device and the workpiece. On the other hand, when it is determined that the operator is operating the workpiece holding device (i.e., the operator has gripped the handle), the lock on each joint portion is released so that the operator can modify the attitude (inclination and conveyance direction) of the workpiece holding device and the workpiece freely.

For example, Japanese Patent Application Publication No. 11-245124 (JP-A-11-245124) and Japanese Patent Application Publication No. 2005-28492 (JP-A-2005-28492) describe the power assist apparatus as described above. The operation of the arm or each joint portion is adjustable to control the attitude of the workpiece while the operator touches the handle. On the other hand, when the operator removes his hand from the handle, the operation of the arm or each joint portion is restricted to maintain the attitude of the workpiece at the moment.

In the case where the workpiece is conveyed using this type of power assist apparatus, when the operator removes his hand from the handle, the attitude of the workpiece is maintained regardless of the attitude of the workpiece at the moment. Therefore, the workpiece may be maintained in a state where the attitude of the workpiece is greatly inclined with respect to the attitude desired by the operator, depending on the attitude of the workpiece when the operator removes his hand from the handle.

Further, if the attitude of the workpiece is fixed in a state in which the workpiece is greatly inclined with respect to the attitude desired by the operator, the workpiece may contact the peripheral portions of a conveyance path of the workpiece or an attachment subject member of the workpiece, causing the workpiece to break. Further, in this situation, the operator must operate the handle again after releasing the brake mechanism, to modify the attitude of the workpiece to the attitude desired by the operator. Thus, a reduction in conveyance efficiency may occur.

SUMMARY OF THE INVENTION

To prevent breakage of a workpiece while the workpiece is conveyed by a power assist apparatus and improve efficiency with which a workpiece is conveyed by the power assist apparatus, the present invention provides a power assist apparatus and a control method thereof with which the attitude of the workpiece can be stabilized easily during conveyance.

A first aspect of the present invention provides a power assist apparatus that includes a workpiece holding device that holds a workpiece; an arm that supports the workpiece holding device; a joint portion that connects the workpiece holding device to the arm to be rotatable in at least one direction; a brake mechanism that restricts rotation of the workpiece holding device in the at least one direction about the joint portion; a switch that is operated by an operator for switching the brake mechanism between a locked state, in which rotation of the workpiece holding device is restricted, and a released state, in which rotation of the workpiece holding device is allowed; an angle sensor that detects a rotation angle of the workpiece holding device about the joint portion in the at least one direction; and a controller that controls the brake mechanism. When the operation of the switch by the operator for switching the brake mechanism from the released state to the locked state is detected, if the rotation angle detected by the angle sensor is greater than a predetermined lower limit and smaller than a predetermined upper limit, the controller switches the brake mechanism from the released state to the locked state. If the rotation angle is no more than the predetermined lower limit or is no less than the predetermined upper limit, the controller maintains the released state of the brake mechanism.

According to the first aspect of the present invention, the workpiece holding device is prevented from remaining in the attitude that will bring the workpiece into contact with the attachment subject member. As a result, breakage of the workpiece and the attachment subject member while the workpiece is conveyed can be prevented.

If the rotation angle detected by the angle sensor is no more than the predetermined lower limit or is no less than the predetermined upper limit, the workpiece holding device may be kept rotatable in the at least one direction without detecting further operation of the switch by the operator.

According to this configuration, when the workpiece holding device takes an attitude that will bring the workpiece into contact with the attachment subject member, the attitude of the workpiece holding device can be easily corrected. As a result, the conveyance efficiency of the workpiece by the power assist apparatus improves.

A second aspect of the present invention provides a method for controlling a power assist apparatus that includes a workpiece holding device that holds a workpiece and is rotatable in at least one direction, and a brake mechanism that restricts the rotation of the workpiece holding device in the at least one direction. In the method, a rotation angle of the workpiece holding device is detected, and an operation of a switch by an operator to switch the brake mechanism from a released state, in which the rotation of the workpiece holding device is allowed, to a locked state, in which the rotation of the workpiece holding device is restricted, is detected. It is determined whether the detected rotation angle is greater than a predetermined lower limit and smaller than a predetermined upper limit, when the operation of the switch by the operator is detected. The brake mechanism is switched from the released state to the locked state when it is determined that the detected rotation angle is greater than the predetermined lower limit and smaller than the predetermined upper limit. The released state of the brake mechanism is maintained when it is determined that the detected rotation angle is no more than the predetermined lower limit or no less than the predetermined upper limit.

According to the second aspect of the present invention, the workpiece holding device is prevented from remaining in the attitude that will bring the workpiece into contact with the attachment subject member. As a result, breakage of the workpiece and the attachment subject member while the workpiece is conveyed can be prevented.

In the method for controlling the power assist apparatus, when it is determined that the detected rotation angle is no more than the predetermined lower limit or is no less than the predetermined upper limit, the workpiece holding device may be kept rotatable in the at least one direction without detecting further operation of the switch by the operator.

According to this configuration, when the workpiece holding device takes an attitude that will bring the workpiece into contact with the attachment subject member, the attitude of the workpiece holding device can be easily corrected. As a result, the conveyance efficiency of the workpiece by the power assist apparatus improves.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
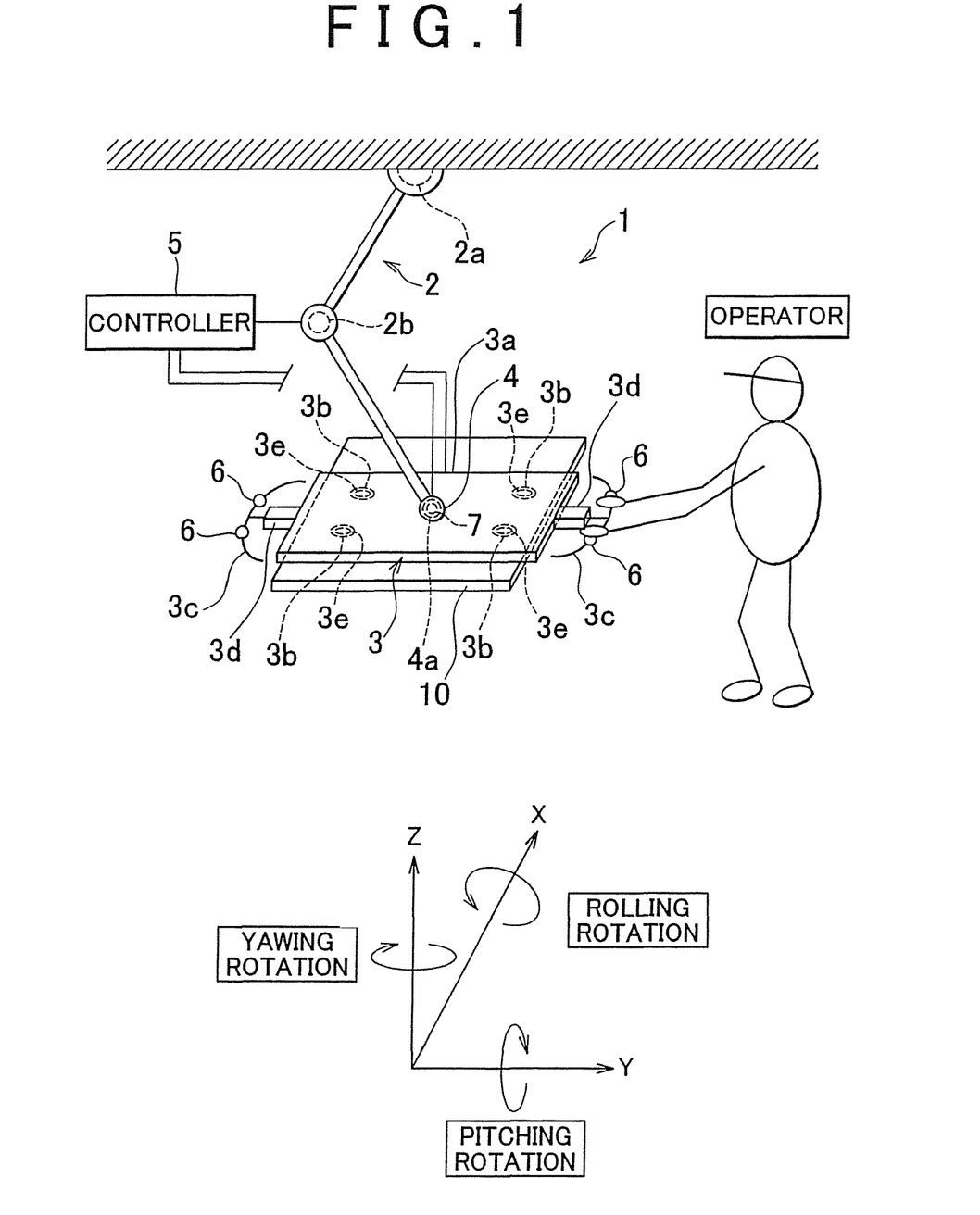
FIG. 1 is a schematic diagram showing the overall constitution of a power assist apparatus according to an embodiment of the invention.
Figure 2:
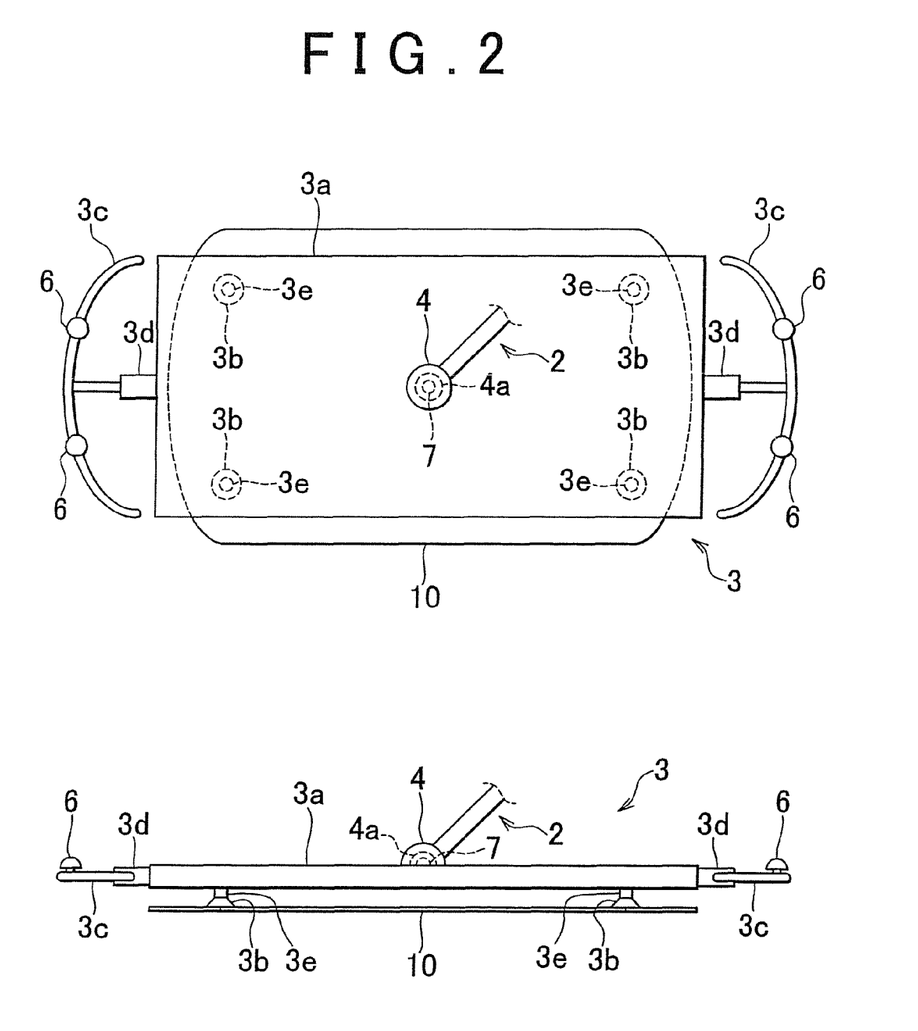
FIG. 2 is a schematic plan view and a schematic side view showing a workpiece holding device according to the embodiment of the invention.
Figure 3:
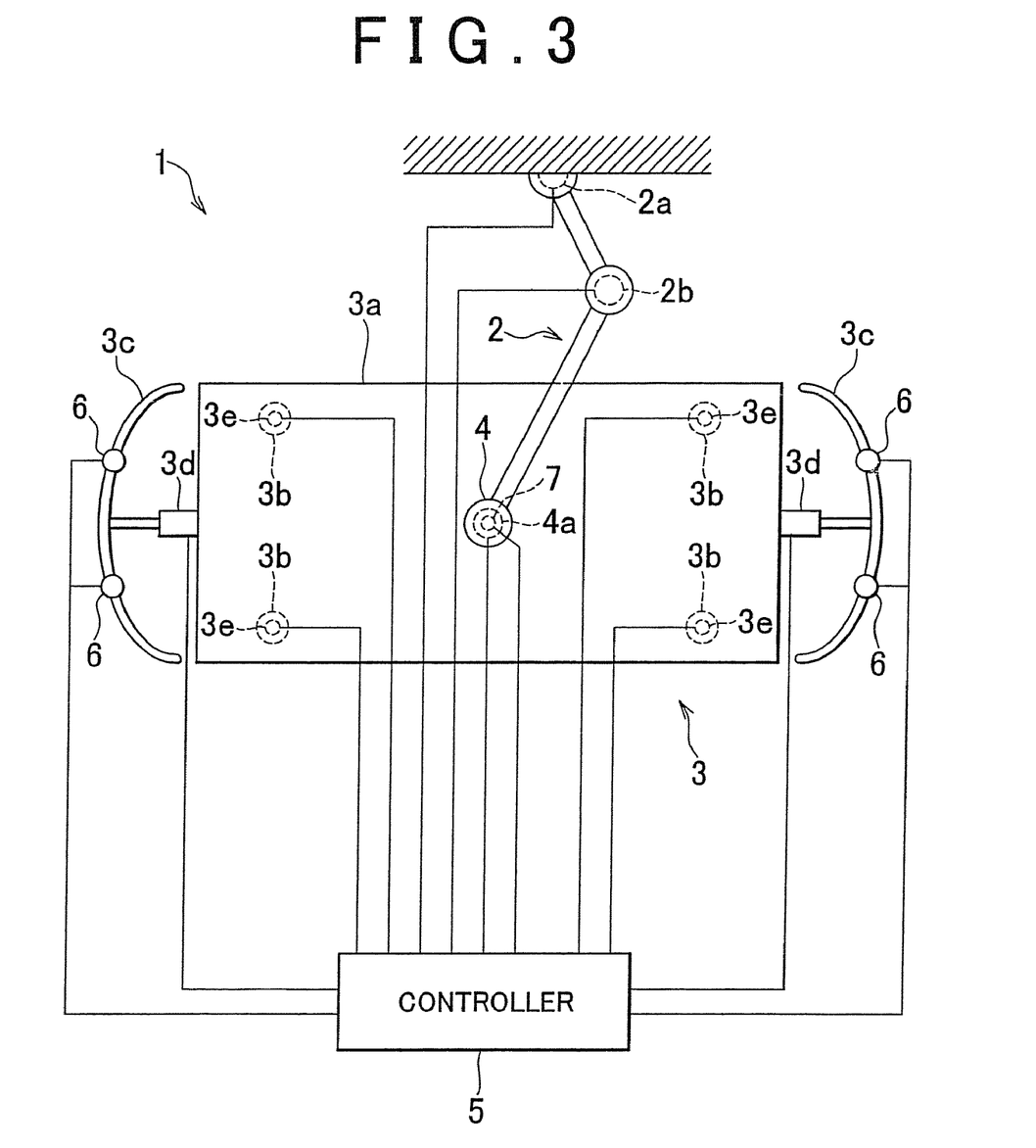
FIG. 3 is a schematic diagram showing a connection condition of a controller according to the embodiment of the invention.

First, the overall constitution of a power assist apparatus 1 according to an embodiment of the invention will be described using FIGS. 1 to 3. FIG. 1 is a schematic diagram showing the overall constitution of the power assist apparatus according to an embodiment of the invention. FIG. 2 is a schematic plan view and a schematic side view showing a workpiece holding device according to the embodiment of the invention. FIG. 3 is a schematic diagram showing a connection condition of a controller according to the embodiment of the invention. Note that for ease of description, it is assumed that the power assist apparatus is provided on an XYZ coordinate system shown in FIG. 1, wherein rotation about the X axis denotes rolling rotation, rotation about the Y axis denotes pitching rotation, and rotation about the Z axis denotes yawing rotation. As shown in FIG. 1, the power assist apparatus 1 according to this embodiment includes an articulated robot 2, a workpiece holding device 3, a free joint 4, a controller 5, and dead man switches 6.

The articulated robot 2 according to this embodiment is supported so as to hang from a ceiling surface or the like, and includes motors 2a, 2b on joint parts thereof. Note that the articulated robot 2 according to this embodiment is supported fixedly on a ceiling surface, but may be supported by a hoist or the like to be capable of travel, for example. Further, the robot used in the power assist apparatus 1 is not limited to the articulated robot 2, and any other robot may be used as long as it is capable of supporting the workpiece holding device 3 via the free joint 4.

As shown in FIGS. 1 and 2, the workpiece holding device 3 includes a substantially flat plate-shaped main body portion 3a, suckers 3b serving as holding portions for holding a window 10 serving as a conveyance subject (workpiece), handles 3c, force sensors 3d, contact pressure sensors 3e, and so on, and is connected to the articulated robot 2 via the free joint 4, which is fixed to the main body portion 3a.

The sucker 3b is formed such that a suction action thereof can be switched ON and OFF. Furthermore, the contact pressure sensor 3e is built into the sucker 3b such that the sucker 3b is capable of detecting a pressure (a reaction force) received when the suction-held window 10 comes into contact with its surroundings. Further, the force sensor 3d is provided on a base portion of the handle 3c, which serves as a gripping portion gripped by the operator.

Further, the dead man switches 6 are provided on the handles 3c of the workpiece holding device 3. The dead man switch 6 is disposed in a position where it can be operated naturally by the operator while gripping the handle 3c, and is provided to detect the gripping state (i.e. the operation state) of the workpiece holding device 3 by the operator. Note that this embodiment illustrates an example in which the dead man switches 6 is provided in a total of four locations on the handles 3c, but the invention is not limited by the disposal locations and number of the dead man switch 6.

The free joint 4 is a joint member capable of rotating freely in all rotation directions, i.e. rolling, pitching, and yawing directions. Further, the free joint 4 is provided with a brake mechanism 4a such that rotation in each of the rolling, pitching and yawing rotation directions can be restricted individually on the basis of a command from the controller 5.

Further, the free joint 4 is provided with an angle sensor 7 to detect the rotation angle of the free joint 4 (rotation angle θ of workpiece holding device 3 described later) in each of the rolling, pitching and yawing rotation directions. Incidentally, the angle sensor according to the claimed invention is not limited to the rotation sensor 7 described above. For example, a separate angle sensor may be provided around the workpiece holding device 3, as long as the inclination angle of the workpiece holding device 3 can be appropriately detected.

When an ON (or OFF) signal, indicating that the operator is operating the dead man switch 6, is input to the controller 5, the controller 5 switches the operation states of the brake mechanism 4a. Incidentally, in this embodiment, the operation states of the brake mechanism 4a are switched over by the operation of the dead man switch 6; however, a separate switch may be provided to switch the operation states of the brake mechanism 4a.

The power assist apparatus 1 is a robot in which multiple degrees of freedom are formed by connecting the workpiece holding device 3 to the articulated robot 2 via the free joint 4, and constitutes a conveyor for conveying the window 10 using the articulated robot 2, the workpiece holding device 3, the free joint 4, the controller 5, and so on. Note that the robot to which the invention is applied is not limited to a robot having multiple degrees of freedom, and may be a robot having only one degree of freedom.

The controller 5 is connected to the articulated robot 2, the workpiece holding device 3, the free joint 4, and so on. The connection condition between the controller 5 and the respective units will now be described in further detail. As shown in FIG. 3, the controller 5 is connected to the motors 2a, 2b of the articulated robot 2, the force sensors 3d and the contact pressure sensors 3e of the workpiece holding device 3, the brake mechanism 4a of the free joint 4, the dead man switches 6, and so on.

By connecting the controller 5 to the motors 2a, 2b of the articulated robot 2, the attitude of the articulated robot 2 is controlled on the basis of an instruction from the controller 5. By connecting the controller 5 to the force sensors 3d of the workpiece holding device 3, the controller 5 detects an operation direction, an operating force, and so on of the workpiece holding device 3 generated when the operator grips the handles 3c and operates the workpiece holding device 3 in a desired direction. In other words, when detection information relating to the operating condition of the operator is input into the controller 5 by the force sensors 3d, the controller 5 determines the desired operation direction of the operator on the basis of this detection information, and controls an operation of the motor 2a to control the attitude of the articulated robot 2. Note that in this embodiment, a six component load cell is used as the force sensor 3d.

By connecting the controller 5 to the contact pressure sensors 3e of the workpiece holding device 3, the controller 5 determines from the pressure detected by the contact pressure sensors 3e whether or not the window 10 is pressed against the body in an attachment subject position with a pressing force corresponding to a prescribed value. Further, by detecting bias in the detected pressure values detected by the plurality of contact pressure sensors 3e, the controller 5 determines whether or not the window 10 is pressed against the body evenly.

By connecting the controller 5 to the brake mechanism 4a of the free joint 4, rotation of the free joint 4 is restricted or permitted on the basis of an instruction from the controller 5. Thus, the attitude of the workpiece holding device 3 can be restricted.

By connecting the controller 5 to the dead man switches 6, the controller 5 detects the gripping state of the operator in relation to the workpiece holding device 3. More specifically, when an ON (or OFF) signal is input into the controller 5 from the dead man switch 6, the controller 5 determines whether or not the operator is gripping the workpiece holding device 3 (i.e. whether or not the workpiece holding device 3 is in an operative state).

A position information map relating to the workpiece holding device 3 is stored in the controller 5 in advance. The position information map includes information (track information) relating to a track that is suitable as a conveyance path for a conveyance subject (the window 10 or the like). The controller 5 controls operations of the articulated robot 2 on the basis of this track information such that the workpiece holding device 3 is displaced along the track. Further, the position information map stored in the controller 5 includes information relating to the control operations respectively set for areas where the workpiece holding device 3 is positioned. The controller 5 controls the operation of the motors 2a, 2b and the brake mechanism 4a in accordance with the position information relating to the workpiece holding device 3.

Further, a vehicle type information map relating to an automobile is stored in the controller 5 in advance. Then, in accordance with the type of an automobile serving as the attachment subject, the controller 5 selectively switches the track information described above, automatically modifies information relating to an appropriate angle for window attachment, and so on.

Figure 4:
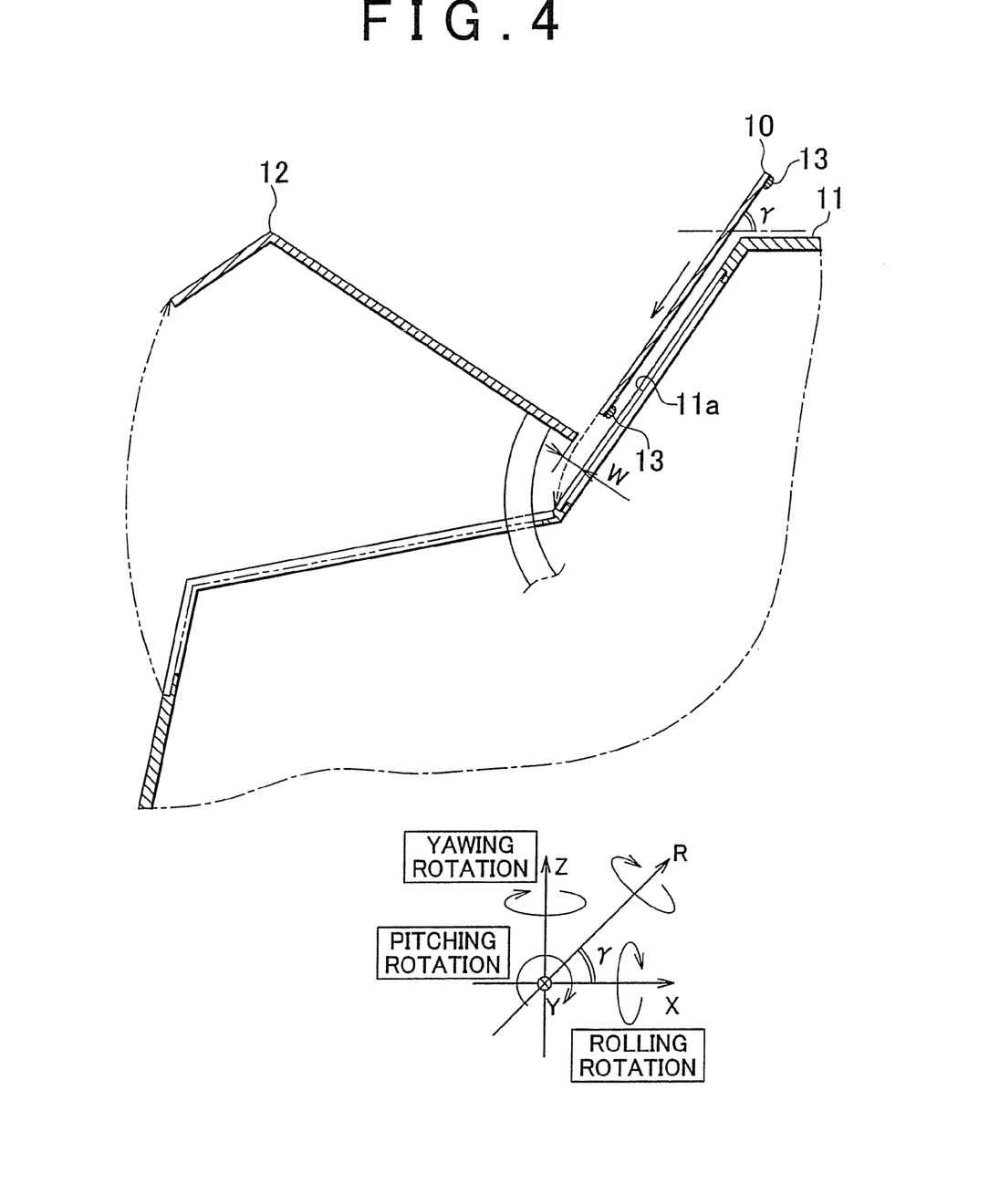
FIG. 4 is an illustrative view showing an outline of a window and an attachment subject member (body) thereof, according to the embodiment of the invention.
Figure 5:
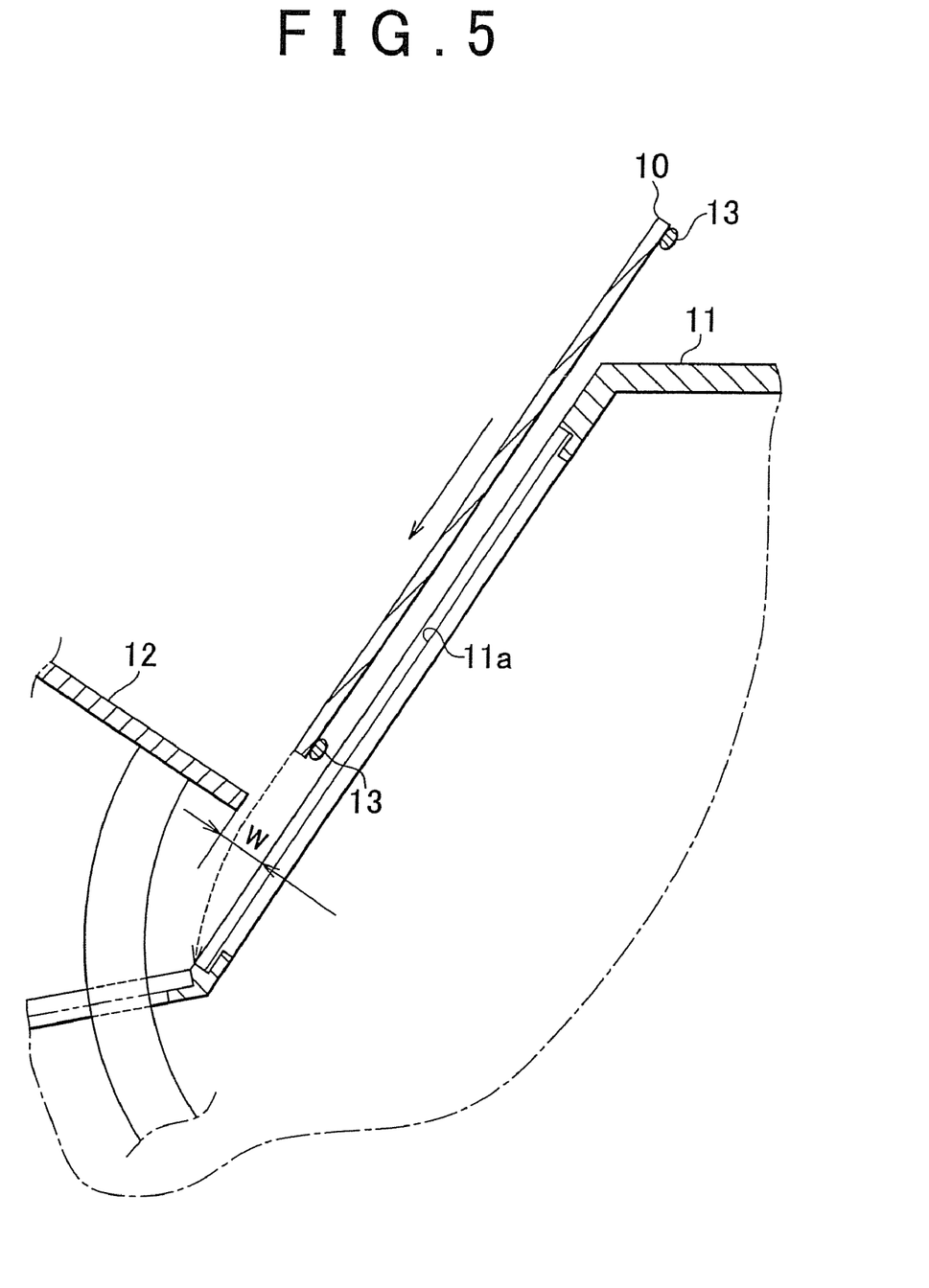
FIG. 5 is an enlarged illustrative view showing a window attachment surface of the body.
Figure 6:
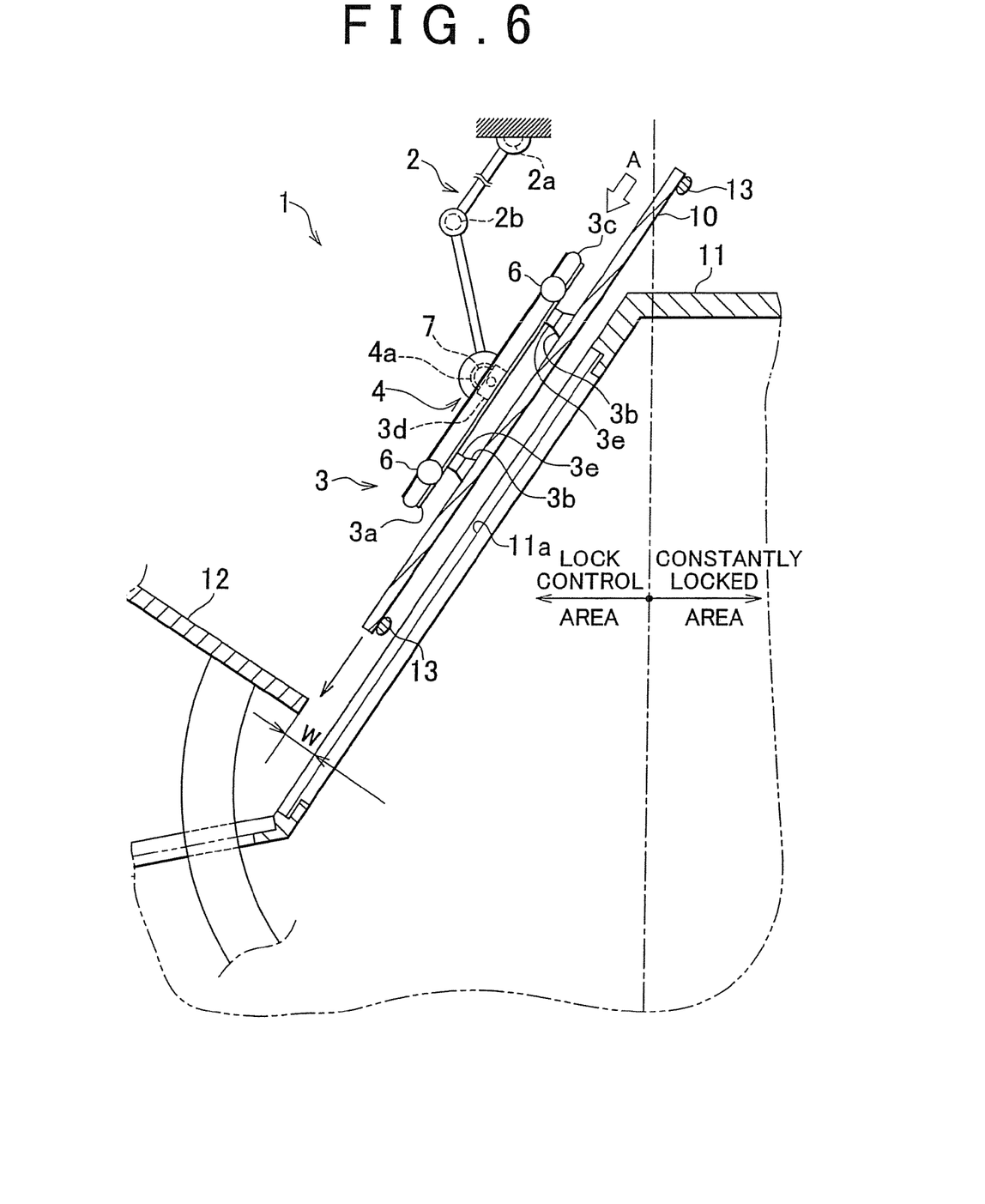
FIG. 6 is a schematic view showing an operation of the workpiece holding device upon entering a lock control area based on a control method of the power assist apparatus according to the embodiment of the present invention.
Figure 7A:
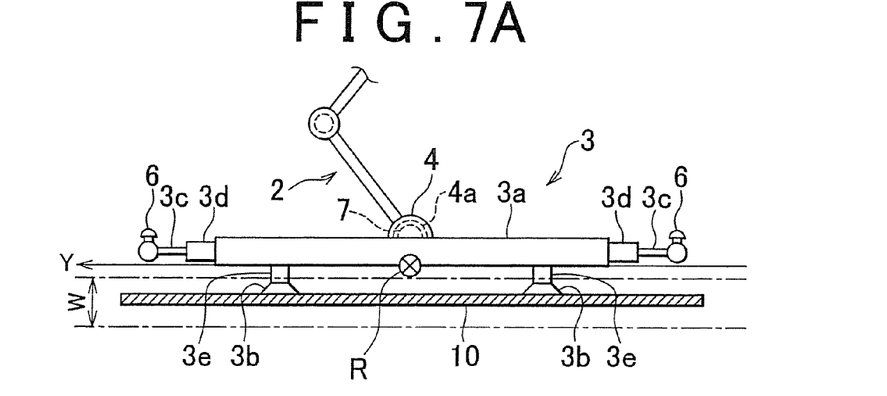
FIG. 7A is a schematic view showing a roll state (in a horizontal position) of the workpiece holding device according to the embodiment.
Figure 7B:
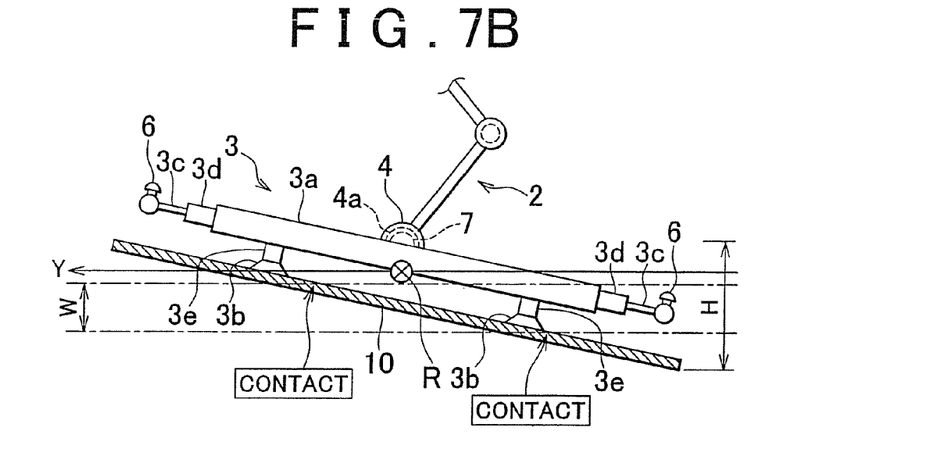
FIG. 7B is a schematic view showing a roll state (in an excessively inclined position to the positive side) of the workpiece holding device according to the embodiment.
Figure 7C:
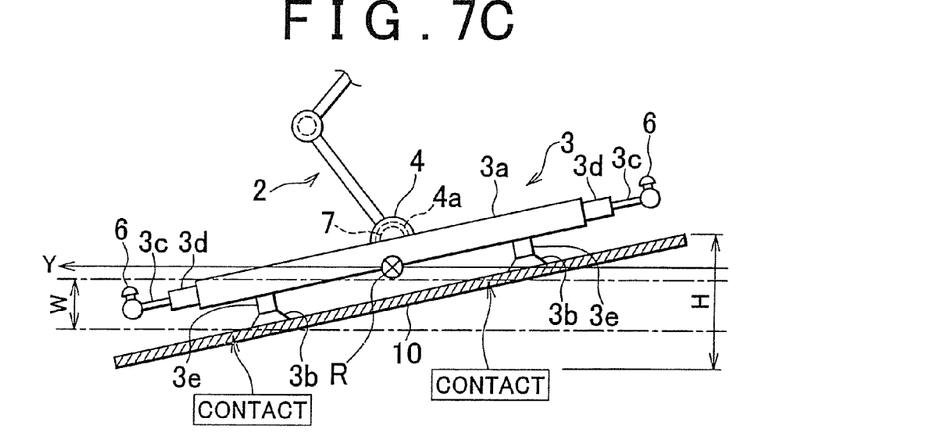
FIG. 7C is a schematic view showing a roll state (in an excessively inclined position to the negative side) of the workpiece holding device according to the embodiment.
Figure 8A:
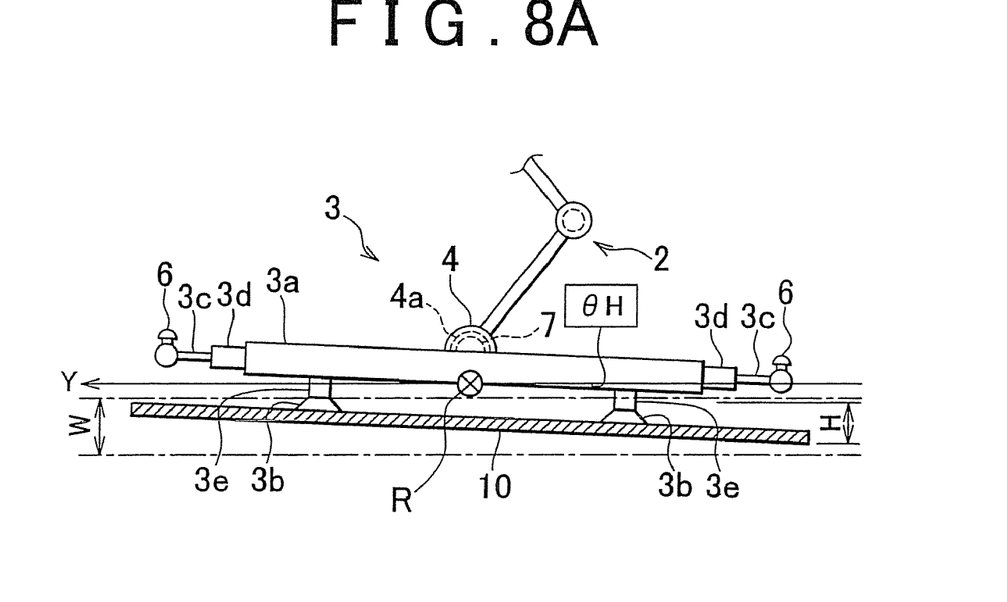
FIG. 8A is a schematic view showing a roll state (in a position inclined to the positive side within an acceptable range) of the workpiece holding device according to the embodiment.
Figure 8B:
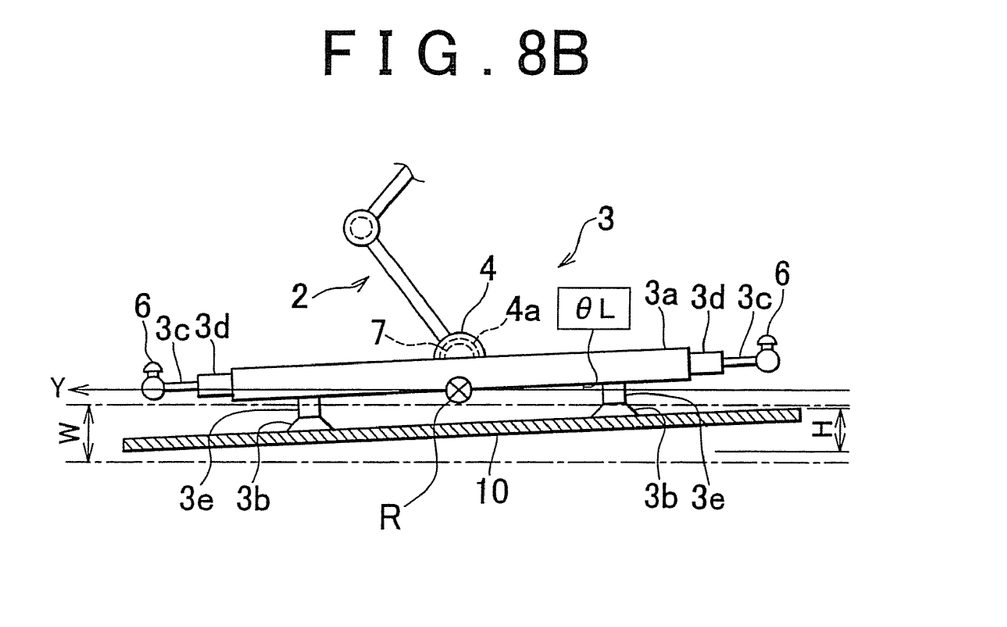
FIG. 8B is a schematic view showing a roll state (in a position inclined to the negative side within an acceptable range) of the workpiece holding device according to the embodiment.
Figure 9:
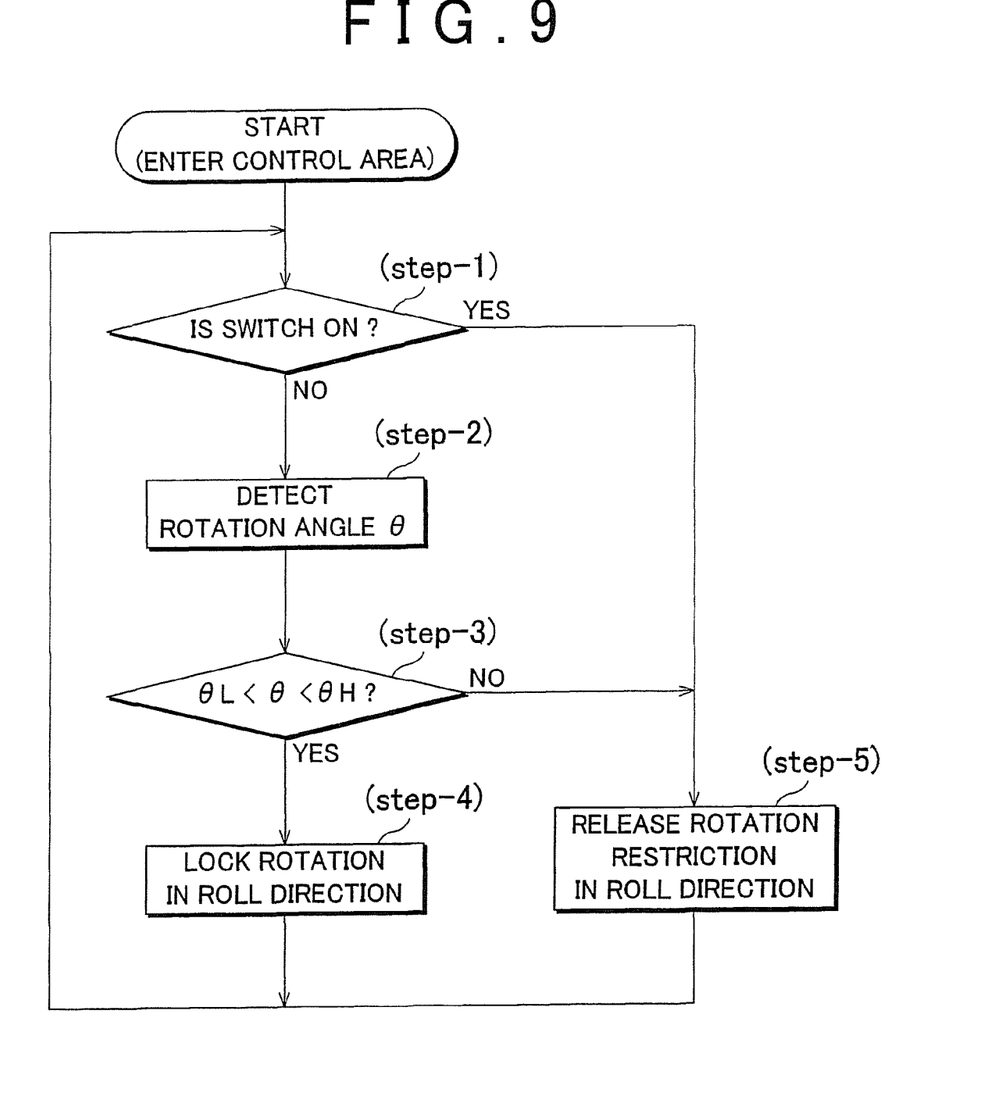
FIG. 9 is a flowchart showing an example of a control operation of the power assist apparatus according to the embodiment of the present invention.
Figure 10:
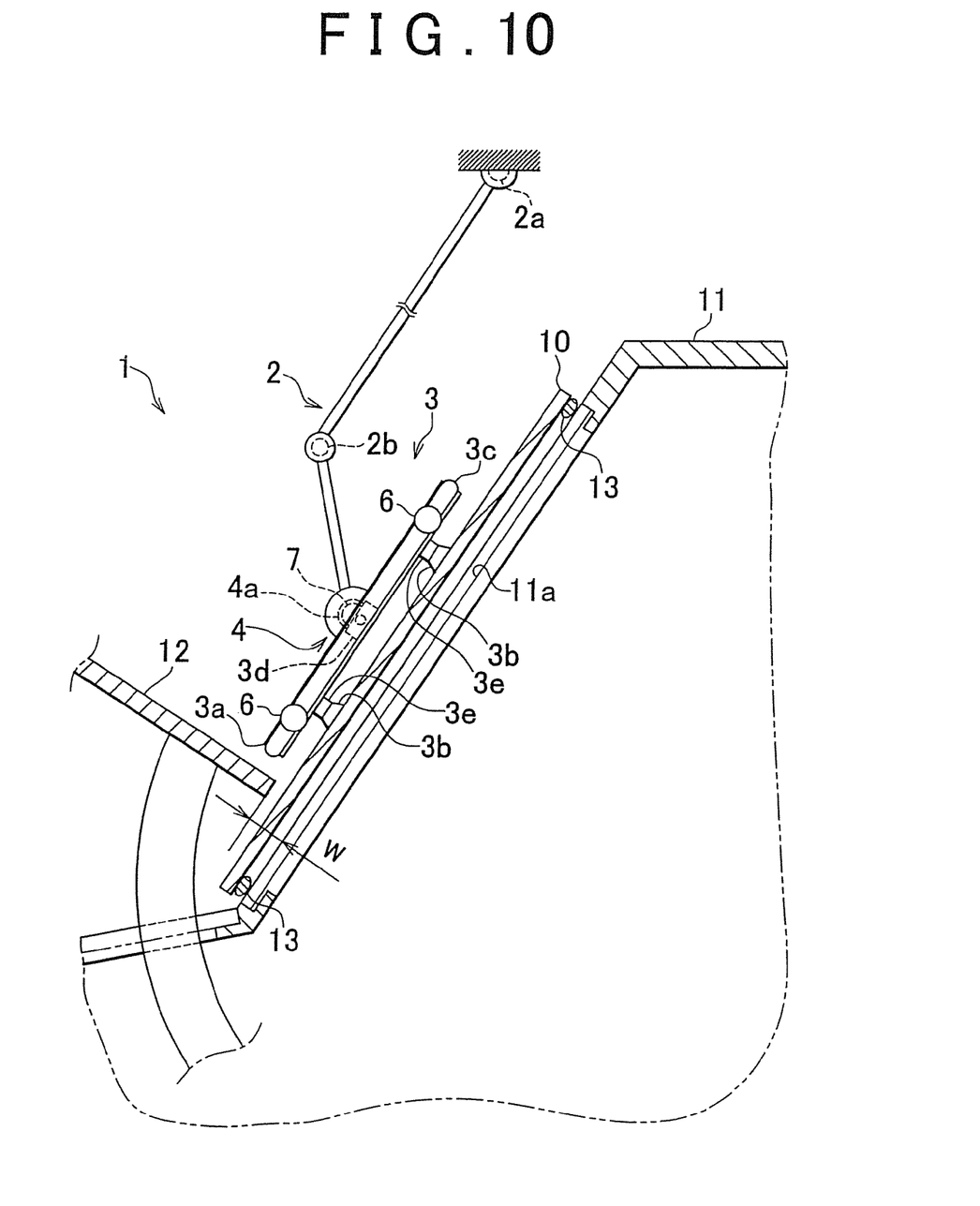
FIG. 10 is a schematic view showing an operation of the workpiece holding device during the insertion of the workpiece based on the control method of the power assist apparatus according to the embodiment of the present invention.

Next, a series of steps of an attachment operation performed by the power assist apparatus 1 according to an embodiment of the invention in relation to the window 10 will be described using FIGS. 4 to 10. FIG. 4 is an illustrative view showing an outline of a window and an attachment subject member (body) thereof, according to an embodiment of the invention. FIG. 5 is an enlarged illustrative view showing a window attachment surface of the body. FIG. 6 is a schematic view showing an operation of the workpiece holding device upon entering a lock control area based on a control method of the power assist apparatus according to the embodiment of the present invention. FIG. 7A is a schematic view showing a roll state (in a horizontal position) of the workpiece holding device. FIG. 7B is a schematic view showing a roll state (in an excessively inclined position to the positive side) of the workpiece holding device. FIG. 7C is a schematic view showing a roll state (in an excessively inclined position to the negative side) of the workpiece holding device. FIG. 8A is a schematic view showing a roll state (in a position inclined to the positive side within an acceptable range) of the workpiece holding device. FIG. 8B is a schematic view showing a roll state (in a position inclined to the negative side within an acceptable range) of the workpiece holding device. FIG. 9 is a flowchart showing an example of a control process of the power assist apparatus according to the embodiment of the present invention. FIG. 10 is a schematic view showing an operation of the workpiece holding device during the insertion of the workpiece based on the control method of the power assist apparatus according to the embodiment of the present invention. Note that for ease of description, it is assumed that the power assist apparatus is provided on an XYZ coordinate system shown in FIG. 4, and rotation about the X axis denotes rolling rotation, rotation about the Y axis denotes pitching rotation, and rotation about the Z axis denotes yawing rotation. Further, it is assumed that with respect to the rotation about each axis, each rotation direction shown by an arrow in FIG. 4 denotes a positive rotation direction about each axis, and each opposite rotation direction denotes a negative rotation direction about each axis.

In this embodiment, an example in which a series of operations is performed to attach a window to a body of an automobile using the power assist apparatus will be described. Note that in this embodiment, the power assist apparatus is used in a window attachment operation, but the power assist apparatus of the invention is not limited to this application.

As shown in FIGS. 4 and 5, in an operation to attach the window 10 to a window attachment surface 11a formed on a body 11 of an automobile, the window 10 must be conveyed in a state inclined at angle $\chi$ to the window attachment surface 11a through a gap W between the body 11 and a luggage hatch 12. Furthermore, an adhesive 13 is applied to a peripheral edge portion of the window 10, and therefore conveyance must be performed such that the adhesive 13 does not adhere to unnecessary locations of the body 11 during conveyance of the window 10.

More specifically, if the attitude of the window 10 is disturbed during conveyance in the operation to attach the window 10 using the power assist apparatus 1, the window 10 may contact the body 11 and the luggage hatch 12, and as a result, the window 10, the body 11, and the luggage hatch 12 may break or the adhesive 13 may adhere to unnecessary locations of the body 11 and the luggage hatch 12.

Incidentally, in this embodiment, because the window 10 is inclined at an angle $\chi$ about the Y axis in a positive rotation direction, an R axis that forms angle $\chi$ with the X axis (see FIG. 4) is temporary set. The power assist apparatus 1 that allows the rolling rotation of the window 10 about the R axis is used in the description below.

The power assist apparatus 1 particularly prevents an excessive rolling rotation of the workpiece about the R axis causing the disturbance in the attitude of the workpiece during the conveyance. By doing so, when the workpiece is conveyed through a gap in the attachment subject, breakage of and damage to the workpiece and so on can be prevented and the workpiece can be conveyed efficiently.

Incidentally, in this embodiment, for the ease of description, a case where the workpiece rotates in the rolling direction about the R axis is described. However, the axis to be used (i.e., the axis about which the rotation attitude is controlled) may change depending on the positional relationship between the workpiece and the attachment position of the workpiece. In other words, the control method is not limited to that controlling the rotation attitude about the R axis, rather the control method according to the invention may control the rotation attitude about any axis.

Note that although the power assist apparatus according to this embodiment is particularly effective in cases where the workpiece is conveyed through a gap in the attachment subject, the power assist apparatus is not limited to such cases, and also achieves efficient conveyance of the workpiece in cases where the likelihood of contact between the workpiece and the attachment subject is low. An attachment operation performed by the power assist apparatus 1 according to this embodiment on the window 10 will be described in detail below.

As shown in FIG. 6, in this embodiment, the control operation starts when the workpiece holding device 3 enters a preset area to perform lock control. Here, when the workpiece holding device 3 and the window 10 are viewed from the direction of arrow A shown in FIG. 6, a state as shown in FIG. 7A is observed in a case where the window 10 is generally parallel to the body 11. In this state, the window 10 stays in the range of gap W. Thus, if the window 10 is conveyed such that the window 10 maintains the state generally parallel to the body 11, the window 10 can be conveyed while avoiding the contact between the window 10 and the peripheral portion (body 11, luggage hatch 12, and so on) of the gap W.

However, as shown in FIGS. 7B and 7C, the workpiece holding device 3 and the window 10 rotate about the R axis and the window 10 is inclined with respect to the body 11, the height H of the window 10 may exceed the range of gap W. If the window 10 continues to be conveyed in such an inclined state, the window 10 will come into contact with the body 11 or luggage hatch 12.

However, when the workpiece holding device 3 and the window 10 rotate about the R axis, the height H of the window 10 does not always exceed the range of the gap W. Even if the window 10 is inclined with respect to the body 11, the height H of the window 10 may be within the range of the gap W.

FIGS. 8A and 8B show such states. When the window 10 is inclined at the angle shown in FIGS. 8A and 8B, the window 10 can be inserted into the gap W without contacting the body 11 and the luggage 12, even if the window 10 continues to be conveyed in the state in which the window 10 is inclined with reference to the body 11.

In this embodiment, a positive side maximum (upper limit) rotation angle $\theta H$ and a negative side maximum (lower limit) rotation angle $\theta L$ are obtained in advance according to the size of window 10 and the width of the gap W, such that the height H of the window 10 remains in the range of gap W when the window 10 rotates about the R axis at the angle between the upper limit angle $\theta H$ and the lower limit rotation angle $\theta L$. Then, the controller 5 controls the attitude of the workpiece holding device 3 to maintain the rotation angle $\theta$ of the workpiece holding device 3 and the window 10 about the R axis within the obtained angle range ($\theta L < \theta < \theta H$). Thus, the window 10 is inserted into the gap W while avoiding contact between the window 10 and the body 11 or the luggage hatch 12.

Next, the control method of the power assist apparatus according to the embodiment of the present invention will be described. As shown in FIGS. 6 and 9, when the workpiece holding device 3 enters the preset lock control area, the control operation starts. First, the controller 5 performs determination based on the pressed state of the dead man switch 6 (Step-1).

When the operator presses the dead man switch 6, and an ON (or OFF) signal, i.e. a signal instructing release of the brake mechanism 4a, is input into the controller 5 from the dead man switch 6, the brake mechanism 4a for restricting the rotation about the R axis is released in accordance with a signal from the controller 5 such that the operator can rotate the workpiece holding device 3 about the R axis freely (Step-5).

Meanwhile, when the operator does not press the dead man switch 6 and so the ON (or OFF) signal is not input into the controller 5 from the dead man switch 6, the angle sensor 7 detects the rotation angle θ of the workpiece holding device 3 about the R axis (Step-2). Then, the controller 5 performs determination based on the rotation angle θ of the workpiece holding device 3 about the R axis detected by the angle sensor 7 (Step 3).

Here, if the rotation angle θ of the workpiece holding device 3 about the R axis detected by the angle sensor 7 is within the angle range (i.e., θL<θ<θH) obtained in advance, the brake mechanism 4a for restricting the rotation about the R axis is operated by a signal from the controller 5 to restrict (lock) the rotation of the workpiece holding device 3 about the R axis by the operation of the operator (Step-4).

In this case, even if the power assist apparatus 1 then continues to convey the window 10, the window 10 can be inserted into the gap W without contacting the body 11 or the luggage hatch 12. Therefore, the brake mechanism 4a is operated to keep the rotation angle θ at this moment.

On the other hand, if the detected rotation angle θ of the workpiece holding device 3 about the R axis is out of the angle range (i.e., θL<θ<θH) obtained in advance, the controller 5 does not issue the signal and so the brake mechanism 4a for restricting the rotation about the R axis is not operated (i.e., the brake mechanism maintains its released state), and so the operation (rotation) of the workpiece holding device 3 about the R axis is not restricted (Step-5).

In this case, if the power assist apparatus 1 then continues to convey the window 10, the window 10 will come into contact with the body 11 or luggage hatch 12, and cannot be inserted into the gap W. Therefore, the brake mechanism 4a maintains its released state to correct the rotation angle θ at this moment.

After the control operation proceeds to either of Step-4 or Step-5, the control is returned to Step-1, and then each operation of Step-1 to Step-4 and Step-5 is repeatedly performed.

In the conventional power assist apparatus, as soon as the operator removes his hand from the dead man switch, the brake mechanism of the free joint is operated so that the workpiece holding device keeps its attitude at the moment.

On the other hand, according to the control method of the power assist apparatus 1 described above, if the detected rotation angle θ of the workpiece holding device 3 is out of the preset angle range (i.e., θL<θ<θH), the workpiece holding device 3 remains rotatable about the R axis even after the operator removes his hand from the dead man switch 6.

Moreover, when the operator senses that the window 10 remains rotatable about the R axis even after he removes his hand from the dead man switch 6, or in other words, the lock of the brake mechanism 4a remains released, the operator comes to know that the rotation angle θ of the workpiece holding device 3 and the window 10 about the R axis is still not in the angle range (i.e., θL<θ<θH) obtained in advance.

When the operator recognizes this information, the operator may try to correct the attitude of the workpiece holding device 3 such that the rotation angle θ of the workpiece holding device 3 falls within the preset angle range (i.e., θL<θ<θH). In this situation, according to the control method of the power assist apparatus 1 of the above-described embodiment, the operator can rotate the workpiece holding device 3 about the R axis even after the operator removes his hand from the dead man switch 6. Thus, the rotation angle θ of the workpiece holding device 3 can be corrected without unnecessary operations of switches, etc.

Then, while the operator gradually rotates the workpiece holding device 3 so that the rotation angle θ of the workpiece holding device 3 and the window 10 approaches the angle range (i.e., θL<θ<θH) obtained in advance, when the rotation angle θ is brought into the angle range obtained in advance, the controller 5 issues a signal to operate the brake mechanism 4a and thus the attitude of the workpiece holding device 3 is automatically locked.

In other words, according to the control method of the power assist apparatus 1 of the above-described embodiment, the operator can easily lock the attitude of the workpiece holding device 3 at an angle that will not bring the window 10 into contact with the body 11 or the luggage hatch 12 simply by rotating the workpiece holding device 3 to the angle to be locked while he keeps his hand removed from the dead man switch 6.

Then, as shown in FIG. 10, after the operator confirms that the workpiece holding device 3 has been locked, the power assist apparatus 1 continues to convey the window 10. Therefore, the window 10 is easily inserted into the gap W without contacting the body 11 or luggage hatch 12, and thus the window can be appropriately disposed immediately above the window 10 attachment surface 11a.

In other words, in the power assist apparatus 2 and the control method of the embodiment described above, when the rotation angle θ of the workpiece holding device 3 in any rotation direction allowed by the free joint 4 detected by the angle sensor 7 is no more than a preset lower limit angle θL or is no less than a preset upper limit angle θH, the workpiece holding device 3 is allowed to rotate in any rotation direction allowed by the free joint 4 even if the operator does not operate the dead man switch 6. According to this configuration, when the workpiece holding device 3 remains in an attitude that may bring the window 10 serving as a workpiece into contact with the body 11, etc. serving as an attachment subject member, the attitude of the workpiece holding device 3 can be easily corrected. Moreover, by doing so, the conveyance efficiency of the window 10 by the power assist apparatus 1 improves, without any trouble in or taking time for the operations to correct the attitude of the workpiece holding device 3.

In other words, according to the control method of the power assist apparatus 1 of the embodiment described above, because the workpiece holding device 3 is controlled by the controller 5, and is not locked at the rotation angle that may bring the window 10 into contact with the body 11 or the luggage hatch 12, the breakage of the window 10, the body 11, the luggage hatch 12 is prevented.

Thus, the power assist apparatus 1 and the control method thereof in the embodiment described above includes the workpiece holding device 3 that holds a window 10 serving as a workpiece; the articulated robot 2 that supports the workpiece holding device 3; the free joint that connects the workpiece holding device 3 to the articulated robot 2 to be rotatable in multiple directions or in a single direction; the brake mechanism 4a that locks the rotation of the workpiece holding device 3 in each rotation direction allowed by the free joint 4; a controller that controls the brake mechanism 4a; the dead man switch 6 that is operated by an operator for switching the brake mechanism 4a from the locked state to the released state or from the released state to the locked state; and the angle sensor 7 that detects a rotation angle of the workpiece holding device 3 in each rotation direction allowed by the free joint 4. After the operator has once released the brake mechanism 4a by operating the dead man switch 6 to release the restriction of the rotation of the workpiece holding device 3 in the rotation direction allowed by the free joint 4, when the operator operates the dead man switch 6 again to cause the brake mechanism 4a to operate, if the rotation angle θ of the workpiece holding device 3 in the rotation direction allowed by the free joint 4 detected by the angle sensor 7 exceeds the predetermined lower limit angle θL and is smaller than the predetermined upper limit angle θH, the brake mechanism 4 switches the brake mechanism 4a from the released state to the locked state to restrict the rotation of the workpiece holding device 3 in the rotation direction allowed by the free joint 4. On the other hand, if the rotation angle θ of the workpiece holding device 3 is no more than the predetermined lower limit θL or no less than the predetermined upper limit angle θH, the released state of the brake mechanism 4a is maintained such that the rotation of the workpiece holding device 3 in the rotation direction allowed by the free joint 4 is not restricted. By thus configured, the workpiece holding device 3 is prevented from remaining in an attitude that will bring the window 10 serving as a workpiece into contact with the body 11 serving as a attachment subject member. Moreover, breakage of and damage to the window 10, body 11 and so on while the window 10 is conveyed can be prevented.

In the above-described embodiment, an example in which the free joint 4 is a joint member with the multiple degrees of freedom of rotation. However, the present invention is not limited by the number of degrees of freedom of rotation of the free joint 4. For example, the free joint 4 may be a joint member that allows only the rotation about the R axis described above. In this case as well, the control method of the power assist apparatus 1 according to the present invention may be applied.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention claimed is:

1. A power assist apparatus comprising:
a workpiece holding device that holds a workpiece;
an arm that supports the workpiece holding device;
a joint portion that connects the workpiece holding device to the arm to be rotatable in at least one direction;
a brake mechanism that restricts rotation of the workpiece holding device in the at least one direction about the joint portion;
a switch that is operated by an operator for switching the brake mechanism between a locked state, in which rotation of the workpiece holding device is restricted, and a released state, in which rotation of the workpiece holding device is allowed;
an angle sensor that detects a rotation angle of the workpiece holding device in the at least one direction about the joint portion; and
a controller configured to control the brake mechanism, when the operation of the switch by the operator for switching the brake mechanism from the released state to the locked state is detected, such that when the rotation angle detected by the angle sensor is greater than a predetermined lower limit and smaller than a predetermined upper limit, the controller switches the brake mechanism from the released state to the locked state, and such that when the rotation angle is less than or equal to the predetermined lower limit or is greater than or equal to the predetermined upper limit, the controller maintains the released state of the brake mechanism.

2. The power assist apparatus according to claim 1, wherein, if the rotation angle detected by the angle sensor is no more than the predetermined lower limit or is no less than the predetermined upper limit, the workpiece holding device is kept rotatable in the at least one direction regardless of detecting further operation of the switch by the operator.

3. The power assist apparatus according to claim 1, wherein the joint portion connects the workpiece holding device to the arm to be rotatable in multiple directions.

4. The power assist apparatus according to claim 1, wherein the operation of the switch by the operator for switching the brake mechanism from the released state to the locked state is detected by detecting release of the switch by the operator.

5. The power assist apparatus according to claim 2, wherein during the rotation of the workpiece holding device without the operation of the switch by the operator, the controller switches the brake mechanism from the released state to the locked state when the rotation angle detected by the angle sensor becomes greater than the predetermined lower limit and smaller than the predetermined upper limit.

6. A method for controlling a power assist apparatus that includes a workpiece holding device that holds a workpiece, an arm that supports the workpiece holding device, a joint portion that connects the workpiece holding device to the arm to be rotatable in at least one direction, a brake mechanism that restricts rotation of the workpiece holding device in the at least one direction, and a controller that controls the brake mechanism, the method comprising:
detecting a rotation angle of the workpiece holding device in the at least one direction about the joint portion with an angle sensor;
detecting an operation of a switch by an operator to switch the brake mechanism from a released state, in which rotation of the workpiece holding device is allowed, to a locked state, in which rotation of the workpiece holding device is restricted;
determining whether the detected rotation angle is greater than a predetermined lower limit and smaller than a predetermined upper limit, when the operation of the switch by the operator is detected;
switching the brake mechanism from the released state to the locked state when it is determined that the detected rotation angle is greater than the predetermined lower limit and smaller than the predetermined upper limit; and
maintaining the released state of the brake mechanism when it is determined that the detected rotation angle is less than or equal to the predetermined lower limit or is greater than or equal to the predetermined upper limit.

7. The method for controlling the power assist apparatus according to claim 6, wherein when it is determined that the detected rotation angle is no more than the predetermined lower limit and is no less than the predetermined upper limit, the workpiece holding device is kept rotatable in the at least one direction regardless of detecting further operation of the switch by the operator.

8. The method for controlling the power assist apparatus according to claim 6, further comprising detecting an operation of the switch by the operator to switch the brake mechanism from the locked state to the released state to allow the rotation of the workpiece holding device,
wherein it is determined whether the detected rotation angle is greater than the predetermined lower limit and smaller than the predetermined upper limit, when the operation of the switch by the operator to switch the brake mechanism from the released state to the locked state is detected, after the operation of switch by the operator to switch the brake mechanism from the locked state to the released state is detected.

9. The method for controlling the power assist apparatus according to claim 8, wherein if the rotation angle detected by the angle sensor is greater than a predetermined lower limit and smaller than a predetermined upper limit, the controller switches the brake mechanism from the released state to the locked state, and if the rotation angle is no more than the predetermined lower limit or is no less than the predetermined upper limit, the controller maintains the released state of the brake mechanism.

* * * * *